United States Patent [19]

Rawstron

[11] 4,016,907
[45] Apr. 12, 1977

[54] TANK BOTTOM INTERNAL VALVE HOUSING

[75] Inventor: William W. Rawstron, Northboro, Mass.

[73] Assignee: Jamesbury Corporation, Worcester, Mass.

[22] Filed: Oct. 31, 1975

[21] Appl. No.: 627,692

Related U.S. Application Data

[63] Continuation of Ser. No. 476,074, June 3, 1974, abandoned.

[52] U.S. Cl. .............................. 137/797; 251/144; 251/155; 251/306; 285/2
[51] Int. Cl.² ...................... F16L 55/00; F16K 1/22
[58] Field of Search ......... 137/68 R, 797; 251/144, 251/155, 306; 285/1, 2, 3, 4, 331

[56] References Cited

UNITED STATES PATENTS

| | | | |
|---|---|---|---|
| 1,534,136 | 4/1925 | Ostrander | 137/797 X |
| 1,563,554 | 12/1925 | Campbell | 251/144 |
| 1,568,057 | 1/1926 | Carr | 137/797 X |
| 1,633,642 | 6/1927 | Kramer | 137/797 X |
| 2,083,054 | 6/1937 | Cline | 137/797 UX |
| 2,274,439 | 2/1942 | Tinker | 285/331 X |
| 2,832,615 | 4/1958 | Summers | 285/368 X |
| 3,591,131 | 7/1971 | Carlson | 251/144 |
| 3,614,056 | 10/1971 | Alvarez | 251/144 |
| 3,659,877 | 5/1972 | Kubasta | 285/3 |
| 3,680,833 | 8/1972 | McNeely | 251/305 X |

Primary Examiner—Alan Cohan
Assistant Examiner—Gerald A. Michalsky
Attorney, Agent, or Firm—Oblon, Fisher, Spivak, McClelland & Maier

[57] ABSTRACT

Disclosed is a tank bottom internal valve housing. A low profile valve housing with a valve such as a butterfly valve and a means for opening and closing the valve is assembled to a saddle on the tank bottom by a number of bolts located around the periphery of the valve housing and engaging in threaded blind holes in the tank saddle. A discharge nozzle is mounted on the lower face of the valve housing in such a way that the discharge nozzle mounting can be sheared away from the rest of the assembly during, for instance, an accident without affecting the integrity of the valve housing itself. This can be accomplished, on one hand, by using the same bolts for common mounting of the discharge nozzle, valve assembly and saddle with the bolts having a grooved portion between the valve assembly and discharge nozzle and/or a "keying effect" provided by a detent or protrusion on one of the parts consisting of the saddle and valve assembly and a mating recess for accommodating the detent is provided on the other of the parts. Another alternative of the invention contemplates utilizing bolts of smaller diameter to mount the discharge nozzle to the valve assembly than are used to mount the valve assembly to the tank saddle.

3 Claims, 7 Drawing Figures

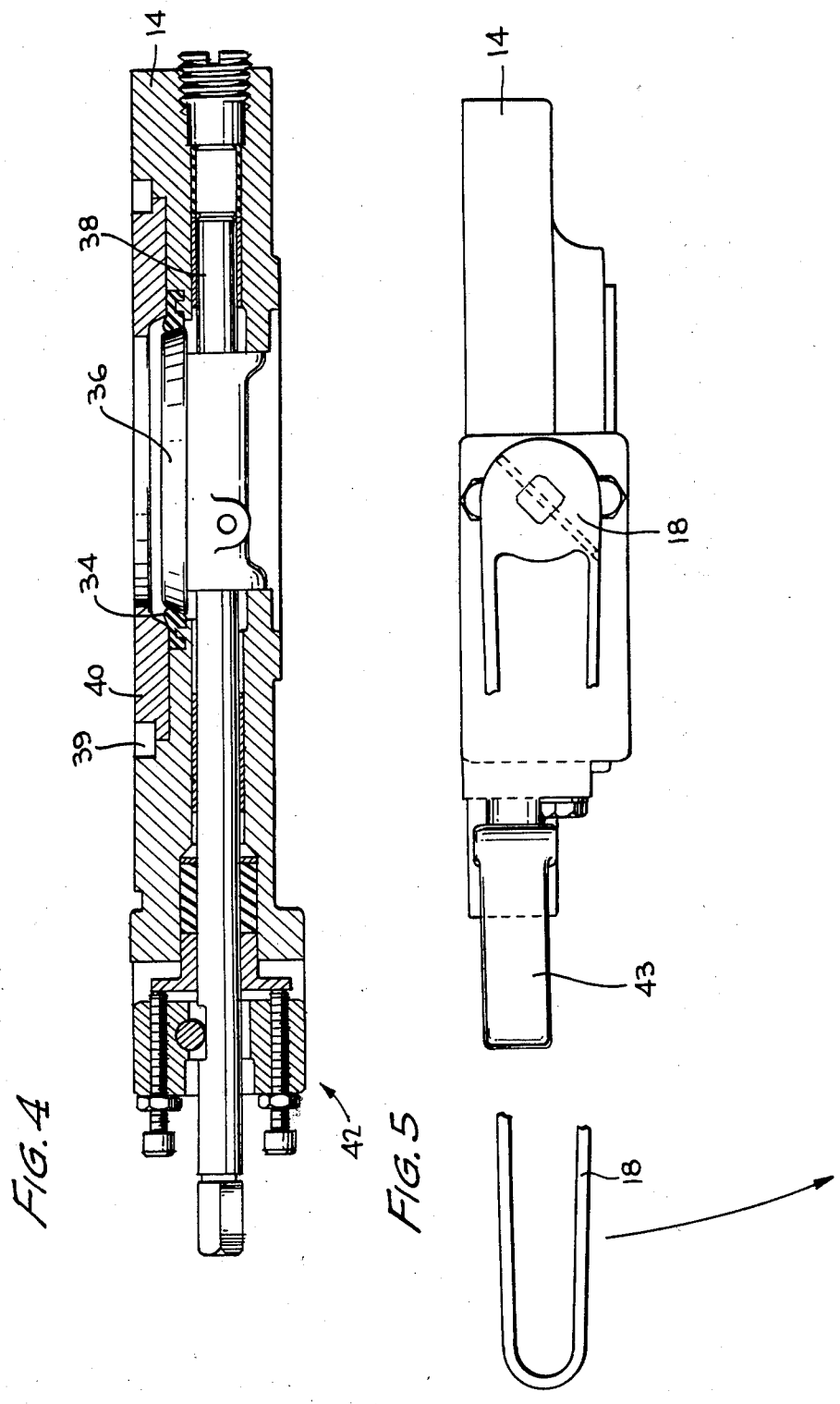

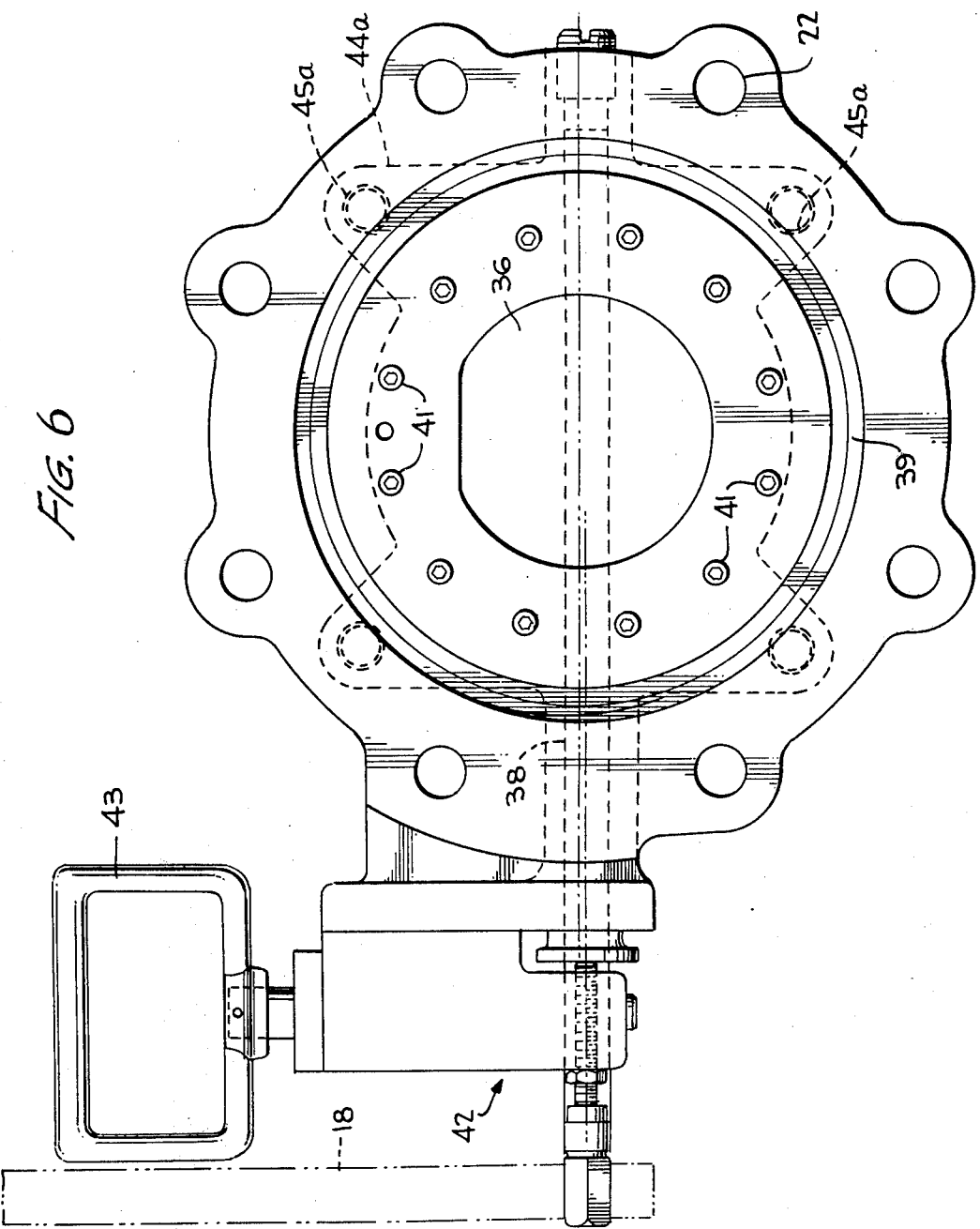

TANK BOTTOM INTERNAL VALVE HOUSING

This is a continuation of application Ser. No. 476,074, filed June 3, 1974, now abandoned.

The subject matter of the present application is directed to a valve housing, and, more particularly, to a tank bottom internal valve housing. The housing of the present invention functions to enhance the internal aspects of the mounting arrangement at the bottom of a tank where a valve is susceptible to damage and the commodity being carried in the tank is thus susceptible to being accidentally discharged.

For the purpose of illustrating the present invention, there is shown in the drawings an embodiment which is presently preferred, it being understood, however, that the arrangement is not limited to the precise instrumentalities and arrangements shown therein.

Figure 2:
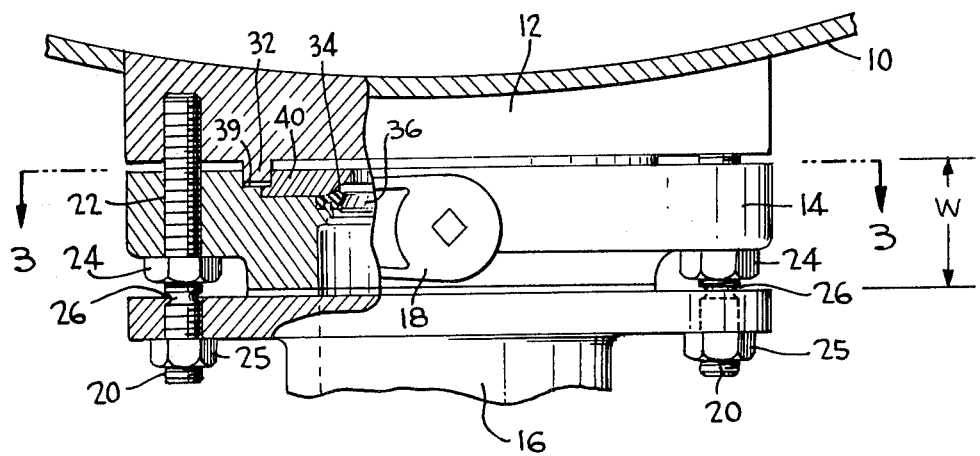
FIG. 2 is an enlarged view, partially in cross-section, of the tank bottom and saddle portion of FIG. 1.
Figure 3:
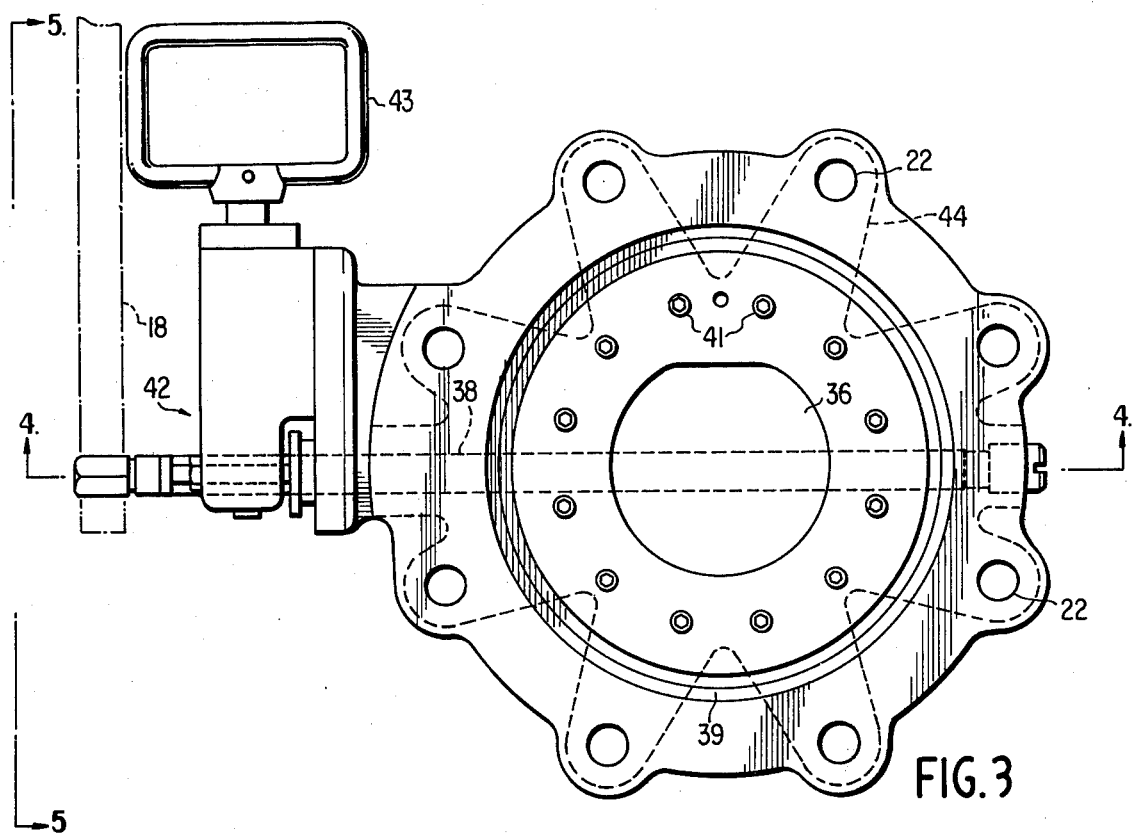

FIG. 3, as viewed in the upright position, is a view taken along lines 3—3 of FIG. 2.

FIG. 4 is a cross-sectional view taken along lines 4—4 of FIG. 3.

FIG. 5 is a view taken along lines 5—5 of FIG. 3.

FIG. 6 is another embodiment of the present invention similar to FIG. 3.

Figure 7:
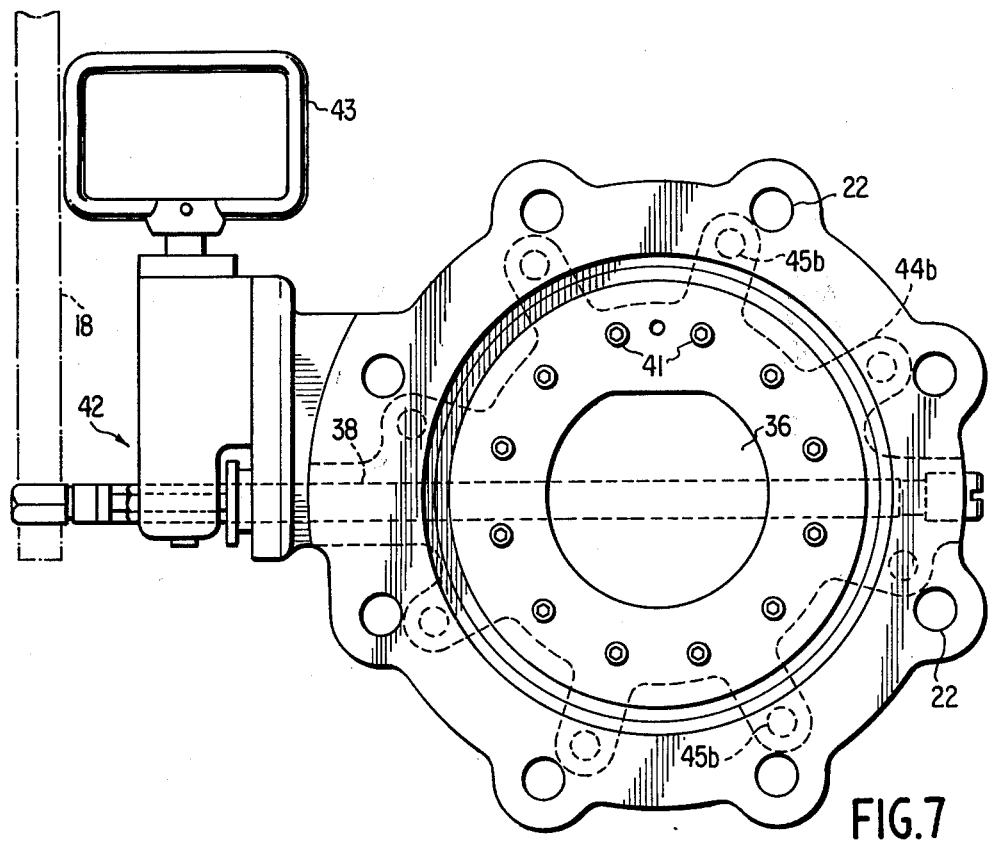

FIG. 7 is another embodiment of the present invention similar to FIG. 3.

Figure 1:
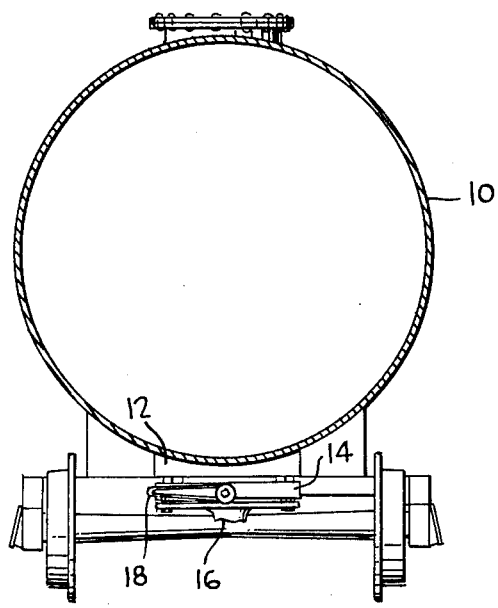
FIG. 1 is a cross-sectional elevation view of a tank with an integral saddle having attached thereto a valve housing and discharge nozzle by the mounting in accordance with the present invention.

Referring now to the drawings, wherein like numerals designate like parts, FIG. 1 is an elevational view of a tank car 10 which can be used for carrying commodities such as liquids, pressurized gasses, slurries and dry powders. This tank 10 has a saddle 12 integrally attached thereto as is shown in more detail in FIG. 2. Rigidly attached to the saddle in a manner to be described more fully hereinbelow is a flanged valve housing 14, a seat 34, a valve body 36 in the form, for example, of a butterfly valve (as illustrated), a stem shaft 38 (FIG. 3), a seat retainer 40 and a handle 18 for opening and closing the valve. A valve discharge nozzle 16 (shown only partially) of a length generally between one to two feet is attached to the valve assembly 14 in the manner to be described below. As shown in FIG. 2, the saddle 12 has a downwardly directed aligning protrusion or embossment 32 which in the illustrated embodiment is a circular protrusion which mates with a recess 39 provided in the opposing face of the valve assembly 14 (shown in FIGS. 2, 3 and 4) to provide a "keying effect" which resists forces tending to shear housing 14 from the saddle 12.

The valve assembly, as shown in the drawings, has a very low profile so that it does not protrude much beyond the saddle 12 and therefore is not exposed to unknown or undesired forces which may occur, for example, during an accident. By way of example, the total height or thickness of the assembly W (FIG. 2) can be about 2⅛ inches. Comparatively speaking, the protrusion of the valve housing 14 from saddle 12 is considerably less than the protrusion of the valve discharge nozzle 16 from housing 14. The valve assembly 14 is connected to saddle 12 by bolts 20. A number of bolt holes 22 are located circumferentially about an integral flange on the body of the valve assembly 14, with the height of the flange being less than the overall height of the valve assembly. As shown in FIG. 3, eight such bolt holes 22 are provided to accommodate the bolts 20 during assembly and the bolts are threadably engaged in mating blind holes provided in the saddle 12. It is readily apparent that the number of holes and bolts can be either increased or decreased depending upon the design requirements. The valve assembly 14 is securely held to the saddle 12 by nuts 24 which are caused to engage against the lower face of the flange on the valve assembly. When so assembled, the valve assembly 14 and saddle 12 provide a low profile on the bottom of the tank car 10. This assembly is also facilitated by the detent or protrusion 32 on saddle 12 and its mating recess 39 on valve assembly 14 which are spaced radially inwardly of the bolt holes 22 and bolts 20 and provide the "keying effect." A sealing ring (not shown) normally is provided between the saddle and the valve assembly in the form of either an asbestos ring or a spiral gasket.

The valve discharge nozzle is assembled to valve housing 14 and saddle 12 also by means of the bolts 20 which extend through mating holes on a flange of the valve discharge nozzle. Nuts 25 are then caused to engage against the lower face of the valve discharge nozzle flange in order to securely join the nozzle 16 to the assembly. Between the valve discharge nozzle 16 and the valve assembly 14, the bolts 20 are provided with grooves 26 which permit the discharge nozzle 16 to be sheared off in the event of an accident without affecting the integrity of the remainder of the valve assembly. By way of example only, the tank 10, saddle 12, valve assembly 14 bolts 20 and nuts 24, 25 can be fabricated from carbon steel or other such appropriate material.

FIGS. 2 and 5 show the valve handle 18 which may be rotated in the direction indicated by the arrow in order to move the valve body 36 to an open position in order to discharge the contents of the tank. A valve seat 34 is mounted in the valve assembly 14 so as to form an effective seal in cooperation with the valve body 36. The seat is retained in the assembly by a body insert 40 and socket head cap screws 41 (FIG. 3) which are threadedly fastened into holes provided in the body insert seat retainer 40 and the valve assembly 14. As best shown in FIG. 3, the valve handle 18 is mounted on the free end of the valve stem 38 such that rotation of the valve handle will produce rotation of the stem shaft which, in turn, produces rotation of the valve body 36 which is rigidly associated with the shaft. When the valve body 36 is rotated 90 degrees from its closed position shown in FIG. 2, it reaches its maximum open position.

A lock housing assembly designated generally by the numeral 42 can be rigidly mounted to the valve assembly 14 for locking the valve in the closed position. Lock housing 42 provides a means for locking the stem shaft 38 and thus prevent the valve from opening unless an axial force is exerted on handle 43 (to the left as shown in FIG. 5). The valve handle 18 and handle 43 of the lock housing assembly are closely spaced with respect to each other. This physical proximity facilitates the opening of the valve by permitting a single operator to exert an axial force on lock handle 43 while, at the same time, rotating handle 18 to open the valve once it has been unlocked.

The present invention contemplates a valve assembly that provides a lower shear strength in the connection from nozzle to valve than in the connection from valve to saddle. This condition will exist if the mathematical product of bolt cross sectional area (taken on a plane normal to the longitudinal axis of the bolt) and bolt unit strength for the nozzle to valve connection is less than that for the valve to saddle connection.

The above described grooved bolts provide such a condition, but, for example, another alternative contemplated includes a valve assembly that is provided with a second flange 44a, as shown in FIG. 6, having bolt holes of a lesser number than the number of bolt holes 22 in the upper flange. The valve discharge nozzle 16 will thus be assembled to the valve assembly 14 by a lesser number of bolts than the number of bolts 20 for attaching the valve assembly 14 to the tank saddle 12. Assuming, of course, that all of the bolts have the same unit strength, a lower shear strength will exist in the connection from nozzle to valve than in the connection from valve to saddle. As a still further alternative, a lower shear strength in the connection from nozzle to valve than in the connection from valve to saddle may be accomplished by employing the same number of bolts (of a given unit strength) in both connections but having the bolts in the valve to saddle connection of a greater diameter than the diameter of the bolts in the nozzle to valve connection, as shown in FIG. 7.

The present invention may be embodied in other specific form without departing from the spirit or central attributes thereof, and accordingly, reference should be made to the appended claims rather than to the foregoing specification as indicating the scope of the invention.

I claim:

1. A tank bottom butterfly valve assembly adapted to be attached to a saddle which is integrally formed with said tank and which has a lower face horizontally disposed to define a first plane, comprising a flanged butterfly valve housing having an upper surface which is substantially planar and has a circular grooved recess adapted to mate with a corresponding protrusion in said saddle when said butterfly valve housing is attached to said saddle such that said upper surface is disposed parallel to said first plane, a lower surface which is substantially planar and which is parallel to said upper surface thereby defining a second plane which is parallel to and below said first plane, a butterfly valve disc and cooperating seat ring which are both completely disposed within the space bounded by said first and second plane when said butterfly disc is in the closed position, a discharge nozzle having an upper surface which is substantially planar and which is mounted to said valve housing such that said nozzle upper surface is disposed substantially parallel to said second plane, first connection means comprising a plurality of bolt holes disposed about the perimeter of said valve housing and adapted to receive a first set of bolts in said bolt holes which attach said valve housing to said saddle with a connection having a first shear strength, second connection means comprising a plurality of bolt holes through said nozzle upper surface and corresponding bolt holes in said valve housing lower surface and adapted to receive a second set of bolts which attach said nozzle to said valve housing with a connection having a second shear strength, said first shear strength being greater than said second shear strength such that unexpected forces on said tank bottom valve assembly will cause said nozzle to separate from said valve housing along the plane between them rather than said valve housing separating from said tank, and thus prevent discharge of the tank contents.

2. The valve assembly of claim 1 wherein the difference in shear strength is attributable to the use of smaller bolts in said second connection means as compared to the bolts used in said first connection means.

3. The valve assembly of claim 1 wherein the bolt holes of said second connection means are fewer in number than the bolt holes of said first connection means so that the difference in shear strength is attributable to the use of a fewer number of bolts in said second connection means as compared to the number of bolts used in said first connection means.

* * * * *

UNITED STATES PATENT AND TRADEMARK OFFICE
CERTIFICATE OF CORRECTION

PATENT NO. : 4,016,907
DATED : April 12, 1977
INVENTOR(S) : William W. Rawstron

It is certified that error appears in the above–identified patent and that said Letters Patent are hereby corrected as shown below:

In item 73, change "Jamesbury Corporation" to --Jamesbury Corp.--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*